United States Patent [19]
Burch et al.

[11] Patent Number: 5,584,031
[45] Date of Patent: Dec. 10, 1996

[54] SYSTEM AND METHOD FOR EXECUTING A LOW POWER DELAY INSTRUCTION

[75] Inventors: Kenneth R. Burch; James R. Feddeler, both of Austin, Tex.

[73] Assignee: Motorola Inc., Schaumburg, Ill.

[21] Appl. No.: 407,792

[22] Filed: Mar. 20, 1995

Related U.S. Application Data

[63] Continuation of Ser. No. 5,949, Nov. 9, 1993, abandoned.
[51] Int. Cl.⁶ .................................................. G06F 1/32
[52] U.S. Cl. .................................................. 395/750
[58] Field of Search .................................. 395/375, 550, 395/650, 750, 800

[56] References Cited

U.S. PATENT DOCUMENTS

| | | | |
|---|---|---|---|
| 3,736,569 | 5/1973 | Bouricius et al. | 340/172.2 |
| 4,203,153 | 5/1980 | Boyd | 364/DIG. 1 |
| 4,792,892 | 12/1988 | Mary et al. | 395/375 |
| 4,875,160 | 10/1989 | Brown, III | 395/375 |
| 4,958,275 | 6/1990 | Youkouchi | 395/375 |
| 5,083,266 | 1/1992 | Watanabe | 395/275 |

OTHER PUBLICATIONS

"M6805 HMOS M146805 CMOS Family Microcomputer/Microprocessor User's Manual", published by Motorola, Inc. in 1983, pp. 79–80, 83–87, 101–102, 211 and 219.

"M68HC11 Reference Manual" published by Motorola, Inc. in 1989, pp. A–74, 6–20; 3–1, 6–19, A–110 to A–111; 5–9, 5–21, A–93.

Computer Organization and Architecture, Principles of Structure and Function, 3rd Edition William Stallings, MacMillan Publishing Co., Pub. Sep. 1992 pp. 378, 468–471, 691.

*Primary Examiner*—Larry D. Donaghue
*Attorney, Agent, or Firm*—Elizabeth A. Apperley

[57] ABSTRACT

A system and method is provided for executing a low power no operation instruction in a data processor (10) with a minimal amount of power consumption. In the instruction, an opcode has a mnemonic form of "SLEEP" and an operand which specifies a number of timing cycles the instruction should be executed. During execution of the SLEEP instruction, the operand is provided to a general register (26) in a CPU (12) of the data processor (10). An ALU (28) accesses the register (26) and decrements the operand until the contents are equal to zero. When the ALU (28) has decremented the operand to zero, a next software instruction is accessed and executed by the data processor.

21 Claims, 2 Drawing Sheets

SYSTEM AND METHOD FOR EXECUTING A LOW POWER DELAY INSTRUCTION

This application is a continuation application Ser. No. 08/005,949, filed Jan. 19, 1993, now abandoned.

FIELD OF THE INVENTION

This invention relates generally to a data processor, and more particularly to a low power instruction in a data processor.

BACKGROUND OF THE INVENTION

Software programs enable a data processor to execute a number of functions necessary for a selected application. Often, those software programs have critical timing periods in which the data processor must wait a predetermined amount of time before executing another function. For example, such critical timing periods may occur while data is being transferred from the data processor or a clock circuit is being stabilized. During such critical timing periods, a number of programming techniques may be used to accurately provide a timing period of the correct length.

In a first programming technique, a timer circuit may be programmed to provide a data processor with an interrupt after a specified amount of time has passed. Additionally, a timer circuit allows a central processing unit of the data processor to continue processing while waiting for the interrupt to occur. In general, timers provide an efficient method for generating interrupts in time critical software applications. However, timers require a significant amount of circuit area to implement and typically are not practical in low cost data processing applications which have limited circuit area. As well, in many data processing applications, power consumption is also an important issue. Timer circuits require power to execute a timing function during operation. Additionally, timer circuits require power to transfer data and address information necessary to both program the timer and to communicate with a central processing unit and other circuits within the data processor. The transfer of information within the data processor from one section of circuitry to the next generally consumes an amount of power which may be prohibitive in data processing applications which require low power consumption.

Additionally, an amount of time required to program a timer circuit to function in a manner determined by the user may be longer than the time period required by the time critical software program. Therefore, in data processing applications which require small time periods for time critical code or which have a need for low power consumption and low cost implementations, a second programming technique may be required.

In the second programming technique, an instruction set of a data processor includes a "no operation" instruction which increments a pointer stored in a program counter register without modifying any other registers in the data processor. An example of such an instruction is provided in the instruction set of the MC68HC05, a microcomputer commercially available from Motorola, Inc. of Austin, Tex. In the MC68HC05 microcomputer, the instruction has the mnemonic form of "NOP." To use the no operation instruction, a user o of the data processor must determine an exact count of the number of timing cycles required, know the critical timing period, and be able to accurately approximate that timing period with a correct number of no operation instructions in a software program. A software program which implements no operation instructions to execute a timing period, may be applied to only the application for which it is designed and is, therefore, not very flexible.

The timing period is generally executed using a plurality of no operation instructions which are executed either successively or in a loop. In either case, memory within the data processor must be used o to store the software necessary to enable the data processor to "wait"for the critical timing period. In many low cost data processors, each byte of memory is necessary to execute a function desired by the user. Although no operation instructions may be necessary in some programming situations, the use of memory to store no operation instructions may prohibit a user from implementing another useful function.

Additionally, in applications which require data processors having low power consumption, the no operation instruction may consume a significant amount of power during execution. Accessing the instruction, transferring address and data values, and incrementing the program counter register all require a significant amount of current in the data processor. Like the timer circuit, the no operation instruction may consume a prohibitive amount of power in low power data processing applications.

For the reasons listed above, it is not generally desirable to write time critical in a software program. However, in some situations, time critical code must be used. For example, in applications which can not implement a timer circuit because of limited circuit area, a no operation instruction may be used to allow the data processor to "wait" for a predetermined period of time without the addition of a significant amount of circuitry.

SUMMARY OF THE INVENTION

The previously mentioned needs are fulfilled with the present invention. Accordingly, there is provided, in a first form, a system for executing a delay instruction in a data processor. The system includes an interface circuit for receiving and decoding the delay instruction. The delay instruction has a first portion for indicating a delay value of the delay instruction. A register has an input coupled to the interface circuit for receiving the delay value. The register stores the delay value therein. A count detect circuit is coupled to the register to receive the delay value. The count detect circuit tests the delay value to provide a tested output signal to indicate whether the delay value is equal to a first predetermined value. An arithmetic logic unit is coupled to the register to receive the delay value. The arithmetic logic unit decrements the delay value by a second predetermined value to provide a decremented delay signal when the tested output signal indicates that the delay value is not equal to the first predetermined value.

In a second form, there is provided a method for executing a delay instruction in a data processor. In a first step, the delay instruction is received and decoded. The delay instruction has a first portion for indicating a delay value of the delay instruction. The delay value is stored in a register. The delay value is tested to provide a tested output signal. The tested output signal indicates if the delay value is equal to a first predetermined value. The delay value is decremented by a second predetermined value if the tested output signal is in a first state. The steps of testing the delay value and decrementing the delay value by the second predetermined value are repeated until the tested output is in a second state.

These and other features, and advantages, will be more clearly understood from the following detailed description

DETAILED DESCRIPTION OF A PREFERRED EMBODIMENT

The present invention provides a system and method for executing a low power no operation instruction in a data processor with a minimal amount of power consumption. In addition to an opcode having a mnemonic form of "SLEEP", the low power no operation instruction includes an operand which specifies a number of timing cycles the SLEEP instruction should be executed. Execution of the low power no operation instruction allows the data processor to "delay-"for an amount of time specified by the operand. The larger the number of timing cycles specified in the operand, the more amount of time the data processor requires to execute the delay operation. When the SLEEP instruction is executed, the operand is provided to a register in a central processing unit (CPU) of the data processor. An arithmetic logic unit (ALU) accesses the register and decrements the contents of the register until the contents are equal to a predetermined value such as zero. When the ALU has decremented the register contents to the predetermined value, a next software instruction is accessed by the data processor.

After being initially accessed, the SLEEP instruction is executed entirely within the CPU of the data processor. Additionally, most of the execution occurs in the ALU of the CPU. Therefore, address and data information is transferred within a concentrated area of the data processor and is not transferred over an entire area of the data processor. This reduces the amount of current drawn during execution of the instruction by reducing a number of transistors enabled during execution of the instruction. Additionally, a capacitance of a plurality of signal lines which are used to transfer the address and data information during execution of the instruction is reduced because the plurality of signals lines are concentrated in a small area of the CPU and do not have to be routed over a large area of the data processor. Therefore, power consumption of the data processor is decreased and low power data processing applications may execute time critical software code more efficiently. Execution of the SLEEP instruction will be subsequently discussed in further detail.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. Additionally, a symbol of "#" before an operand indicates that the operand is being addressed directly. A symbol of "$" before a value indicates that the value is in a hexadecimal form.

Figure 1:
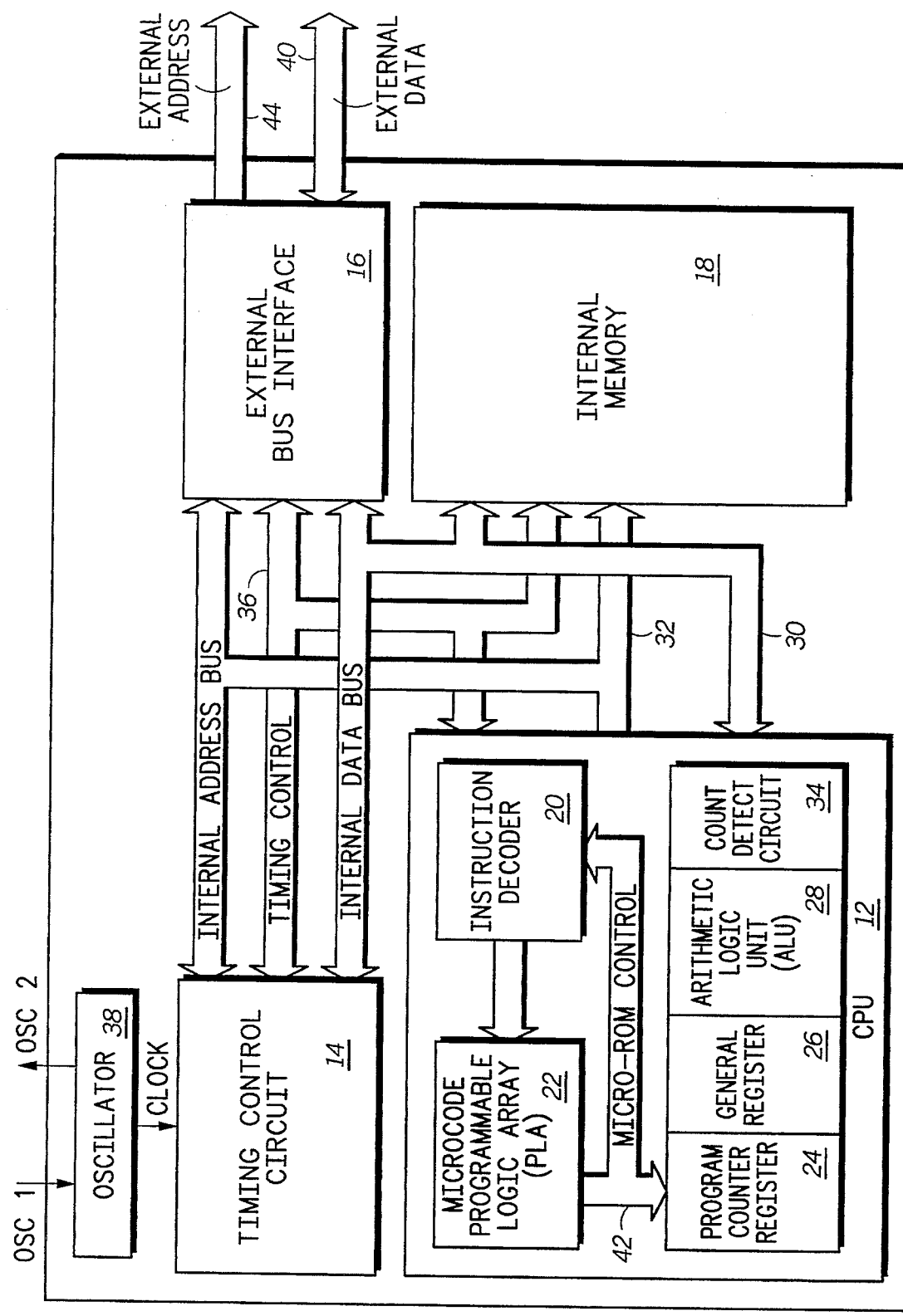
FIG. 1 illustrates in block diagram form a data processing system which executes a low power no operation instruction in accordance with the present invention.

FIG. 1 illustrates one embodiment of a data processing system 10. Data processing system circuitry 10 generally includes a central processing unit (CPU) 12, a timing control circuit 14, an external bus interface 16, an internal memory 18, and an oscillator 38. CPU 12 generally includes an instruction decoder 20, a microcode programmable logic array (PLA) 22, a program counter register 24, a general register 26, an arithmetic logic unit (ALU) 28, and a count detect circuit 34.

During operation, an "Osc 1" signal is provided to oscillator 38 via an external source, such as a crystal (not shown). The crystal is connected between the Osc 1 signal and an "Osc 2" signal to enable the crystal to oscillate. Operation of a crystal oscillator is well known in the data processing art and should be apparent to one with ordinary skill in the art.

In response to the Osc 1 signal, oscillator 38 provides a "Clock" signal to a remaining portion of data processing system 10. Although the Clock signal is provided to each of the components of data processing system 10, such routing is well known in the data processing area and will not be discussed in further detail herein.

Timing control circuit 14 receives the Clock signal and subsequently provides appropriate timing signals to each of CPU 12, external bus interface 16, and internal memory 18 via a Timing Control bus 36.

A plurality of address values are provided from external bus interface 16 via an External Address bus 44. Similarly, a plurality of data values are communicated with external bus interface 16 via an External Data bus 40. External bus interface 16 functions to conununicate address and data values between an external user and data processing system 10. External bus interface 16 provides a plurality of address and data values to a remaining portion of data processing system 10 via an Internal Address bus 32 and an Internal Data bus 30, respectively. Internal memory 18 stores information values necessary for proper operation of data processing system 10. Additionally, other data values may be stored therein if specified in a user program provided via Internal Address bus 32 and Internal Data bus 30.

CPU 12 executes each of the instructions required during operation of data processing system 10. Internal Address bus 32 and Internal Data bus 30 communicate information between CPU 12 and a remaining portion of data processing system 10. Instructions are provided to instruction decoder 20 to be partially decoded. The partially decoded instructions are subsequently provided to microcode PLA 22. Microcode PLA 22 maintains a sequence of execution of each of the instructions to most efficiently utilize the computing capabilities of data processing system 10. Additionally, microcode PLA 22 provides control information to each of instruction decoder 20, program counter register 24, general register 26, ALU 28, and count detect circuit 34 via a Micro-ROM Control bus 42.

In CPU 12, program counter register 24 stores an address value which indicates an address of an instruction currently being executed. The address value may indicate an address in internal memory 18 or an external memory (not shown). General register 26 is a general purpose register which may be used in many different applications. In the embodiment of the invention described herein, general register 26 stores an operand value indicated either directly or indirectly by the instruction provided to data processor 10. ALU 28 performs arithmetic calculations in response to the instruction provided to data processor 10. Use and design of an arithmetic logic unit is well known in the data processing art and will not be discussed in further detail herein. Additionally, count detect circuit 34 is provided to indicate if a value generated by ALU 28 is equal to a predetermined value. In the example described herein, assume that the predetermined value is equal to zero. Again, count detect circuitry is well known in the data processing art and will not be discussed in further detail.

During operation, a user may provide the SLEEP instruction to data processing system 10 through a software program stored either externally or in internal memory 18. Should the SLEEP instruction be provided by a source external to data processing system 10, the SLEEP instruction would be input via External Data bus 40 to external bus interface 16. External bus interface 16 would subsequently provide the SLEEP instruction to CPU 12 via Internal Data bus 30. If the SLEEP instruction was provided by a software program in internal memory 18, the SLEEP instruction would be provided to CPU 12 via Internal Data bus 30.

In this embodiment of the invention, the SLEEP instruction generally has the form of: SLEEP #100. As was previously discussed, in the embodiment of the invention described herein, the "#" symbol indicates that the operand is being addressed directly. The operand of the SLEEP instruction (#100) indicates a number which ALU 28 must decrement to zero during instruction execution. While the operand provided in the form is specified directly, the operand may also be specified using another address mode such as indirect addressing.

When the SLEEP instruction is provided to CPU 12, the SLEEP instruction is first transferred to instruction decoder 20. Instruction decoder 20 partially decodes the SLEEP instruction and then provides the partially decoded instruction to microcode PLA 22. Instruction decoder 20 performs the decoding function in response to timing signals provided via Timing Control bus 36.

Microcode PLA 22 further decodes the SLEEP instruction to provide a plurality of control and information signals necessary for the proper execution of the SLEEP instruction. The plurality of control and information signals are provided to each of program counter 24, general register 26, ALU 28 and count detect circuit 34 via MicroROM Control bus 42. A first one of the plurality of control signals enables general register 26 to store the number to be decremented. As was previously described, the number to be decremented is specified by the operand of the SLEEP instruction and indicates a number of timing cycles for which operation of data processing system 10 is delayed. By delaying for a number of timing cycles specified in the operand of the SLEEP instruction, a critical timing period may be performed using a single instruction.

When the operand has been stored in general register 26, the operand is first tested by count detect circuit 34 to determine if the operand is equal to a predetermined value. In the embodiment of the invention described herein, the predetermined value is equal to zero. If the operand is equal to zero, count detect circuit 34 provides an instruction control signal to microcode PLA 22 via the Micro-ROM Control bus 42 which indicates that a next instruction should be accessed from memory. Microcode PLA 22 subsequently provides control information necessary to increment program counter register 24. Again, the control information is communicated via the MicroROM Control bus 42.

If the operand is not equal to zero, ALU 28 is used to decrement the operand value. General register 26 is connected to ALU 28 to provide the operand value. Upon receipt of the operand value and control information from microcode PLA 22 that the operand value is not equal to zero, ALU 28 decrements the operand value by a predetermined amount. In the embodiment of the invention described herein, the predetermined amount is equal to a value of one. ALU 28 is implemented as a arithmetic logic unit which is well known in the data processing art and will not be illustrated in further detail.

ALU provides a result of the decrement operation to both general register 26 and to count detect circuit 34. General register 26 stores the result of the decrement operation. Count detect circuit 34 tests the result of the decrement operation to determine if the count has been decremented to a value of zero.

The result generated by count detect circuit 34 is again provided to microcode PLA 22 via the Micro-ROM Control bus 42. If the result generated by count detect circuit 34 indicates that the predetermined count value is not equal to zero, the contents of general register 26 are again provided to ALU 28. ALU 28 again decrements the contents of general register 26 and provides the decremented result to both general register 26 and to count detect circuit 34. Count detect circuit 34 subsequently determines whether the decremented result is equal to zero. The steps of testing and decrementing continue until the decremented result is equal to zero.

At that point, the address value stored in program counter register 24 is incremented by an incrementer (not shown). Program counter register 24 is enabled to provide the incremented address value to Internal Address bus 32 such that a next instruction may be accessed and executed by data processing system 10. Microcode PLA 22 provides the control signals necessary to enable program counter register 24 via the Micro-ROM Control bus 42. Additionally, as was previously described, the address value stored in program counter register 24 indicates an address in memory from which the SLEEP instruction is accessed. Whether the memory is internal memory 18 or an external memory (not shown), the address value in program counter register 24 indicates the address of the instruction currently being executed by data processing system 10.

Figure 2:
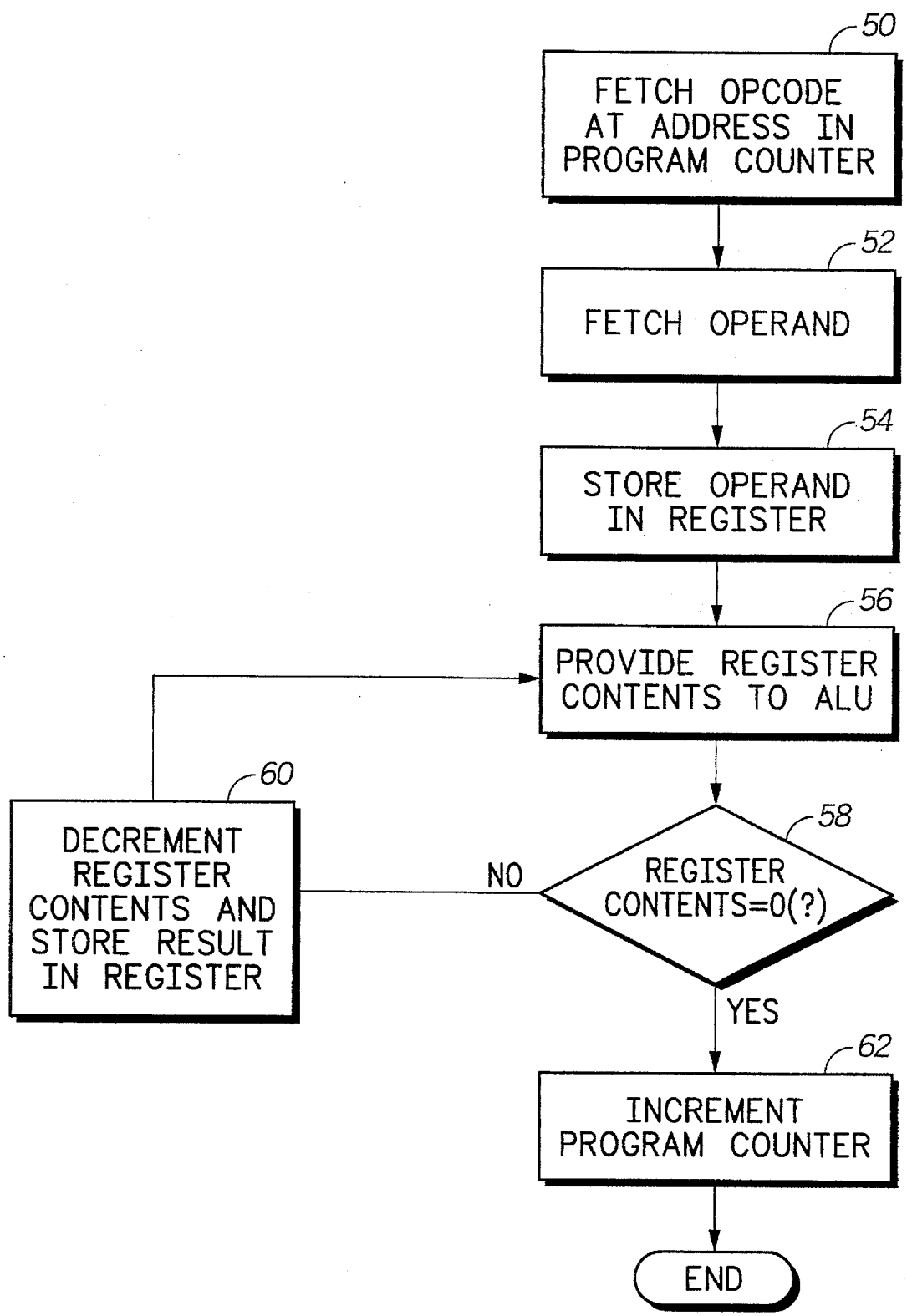
FIG. 2 illustrates in flow chart form execution of the low power no operation instruction.

A summary of the steps performed during execution of the SLEEP instruction is illustrated in a flowchart in FIG. 2. In a first step 50, a SLEEP instruction opcode is fetched from an address value which is stored in program counter register 24. In a next step 52, an operand associated with the SLEEP opcode is also fetched. Both the SLEEP instruction opcode and operand may be fetched from internal memory or from an external memory (not shown).

In a step 54, the operand value is stored in general register 26. The contents of general register 26 are then provided to ALU 28 in step 56. In step 58, the contents of general register 26 are tested to determine if they are equal to zero. If the register contents are not equal to zero, ALU 28 decrements the register contents and stores a result in general register 26 (step 60). The register contents are again provided to ALU 28 (step 56). The steps of 58 and 60 are repeated until the contents of general register 26 are equal to zero. At that point, an address value stored in program counter register 24 is incremented and a next address is accessed.

In summary, in the embodiment of the invention described herein, an instruction is provided which enables a user to perform delay operations with a minimum of power consumption. The SLEEP instruction is executed entirely within CPU 12 of data processing system 10. Therefore, no address or data information is transferred from CPU 12 to any other peripheral device during execution of the instruction.

Because a minimal amount of signal lines in a concentrated area of CPU 12 are used during execution of the SLEEP instruction, power consumption is significantly reduced over the power consumption of traditional no operation instructions.

Additionally, the SLEEP instruction typically consumes less power than a traditional timer circuit implementation. Again, timer circuits tend to be more complex and require a greater amount of circuitry and external communication than the delay instruction described herein. Therefore, the power consumed while communicating with address and data busses is generally significant.

Therefore, the SLEEP instruction provides an efficient method for allowing a user to perform time critical software code while saving power. Although time critical software code is generally not desirable, such code is necessary in some situations. For example, in paging and wireless remote applications, size and cost requirements do not allow for timer circuits to be used. The additional hardware required by such a timer is prohibitive with respect to both size of a die of a data processor and the corresponding cost for the additional functionality. In such applications, software must be used as a substitute for the timer circuit hardware. The SLEEP instruction, therefore, enables the software code written by a designer of such applications to efficiently perform timing operations without an increase in circuit area and with a significant power consumption savings.

Additionally, most data processors may be modified to include the SLEEP instruction with little added circuitry. Because the circuitry necessary to execute the SLEEP instruction is found in the central processing unit of most data processors, additional microcode to implement the instruction is all that is generally required. Therefore, the SLEEP instruction may be easily implemented on most data processors with relatively little cost and will result in significant power savings over traditional software and hardware timing devices.

The implementation of the invention described herein is provided by way of example only. However, many other implementations may exist for executing the function described herein. For example, in the flow chart illustrated in FIG. 2, a prefetch of a next instruction may be implemented by incrementing the program counter after the operand is fetched and stored in general register 26 (steps 52 and 54). Therefore, the instruction flow may be modified to more accurately reflect the requirements of a user of the data processor.

Additionally, in some implementations, an operand of the SLEEP instruction may be a negative value. In such a situation, the ALU would be used to increment the operand until the operand was equal to zero. Again, the count detect circuit would test the operand to determine if it was equal to zero. In another implementation of the invention, the operand of the SLEEP instruction may be incremented or decremented towards a value other than zero. The design and programming techniques necessary to execute each of these alternate embodiments of the invention are well known in the data processing art and will not be discussed in further detail.

As well, CPU 12 illustrates a portion of a central processing unit. It should be understood that additional registers, such as index registers and accumulators may also be included in CPU 12. Additionally, other circuitry to control operation of CPU 12 may also be included.

It should also be understood that data processing system 10 may include other circuits. For example, a timer may be implemented within data processing system 10. In some situations, a user may desire to implement a timer so that the data processor may execute other operations when waiting for a timing interrupt. In such a situation, the user may also want to have low power consumption and the ability to perform a delay operation which requires less time than the timer would be able to efficiently perform.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A system for executing a delay instruction in a data processor, comprising:

an interface circuit for receiving and decoding the delay instruction, the delay instruction having a first portion for indicating a delay value of the delay instruction; and a central processing unit for executing the delay instruction, the central processing unit, comprising:

a register having an input coupled to the interface circuit for receiving the delay value, the register storing the delay value therein;

a count detect circuit coupled to the register to receive the delay value, the count detect circuit testing the delay value to provide a tested output signal to indicate whether the delay value is equal to a first predetermined value; and an arithmetic logic unit coupled to the register to receive the delay value, the arithmetic logic unit decrementing the delay value by a second predetermined value to provide a decremented delay signal when the tested output signal indicates that the delay value is not equal to the first predetermined value the central processing unit terminating execution of the delay instruction when the delay value is equal to the first predetermined value.

2. The system of claim 1 wherein the central processing unit further comprises:

an internal memory, the internal memory storing a software program to be executed by the data processor.

3. The system of claim 2 wherein the central processing unit further comprises:

a program counter register, the program counter register storing an address of an instruction currently being executed by the data processor, the address referring to a storage location in the internal memory, the address stored in the program counter register being incremented when the delay output signal indicates that the decremented delay value is equal to the first predetermined value.

4. The system of claim 1 wherein the delay instruction has an opcode mnemonic of SLEEP.

5. The system of claim 1 wherein the first portion of the delay instruction is a directly addressed operand.

6. The system of claim 1 wherein the delay instruction has a second portion, the second portion being an opcode which indicates that a delay operation is to be executed in the data processor.

7. The system of claim 1 wherein the interface circuit receives and decodes the second portion of the delay instruction to provide a plurality of control signals, the plurality of control signals controlling timing and execution of each of the interface circuit, the arithmetic logic unit, the count detect circuit, and the register in the central processing unit.

8. The system of claim 1 wherein the central processing unit further comprises a microcode programmable logic array to decode the second portion of the delay instruction to provide a plurality of control signals, the plurality of control signals controlling timing and execution of each of the interface circuit, the arithmetic logic unit, the count detect circuit, and the register.

9. The system of claim 1 wherein the arithmetic logic unit has an output coupled to the register, the arithmetic logic unit providing a decremented delay value to the register after decrementing the delay value by the predetermined value, the decremented delay value replacing the delay value currently stored in the register.

10. The system of claim 1 wherein the first predetermined value is equal to zero.

11. The system of claim 1 wherein the second predetermined value is equal to one.

12. A method for executing a delay instruction in a data processor, comprising the steps of:

i) receiving and decoding the delay instruction, in a single interface circuit, the delay instruction having a first portion for indicating a delay value of the delay instruction;

ii) storing the delay value in a register in a central processing unit of the data processor;

iii) testing the delay value to provide a tested output signal, the tested output signal indicating if the delay value is equal to a first predetermined value, the tested output signal provided by a count detect circuit in the central processing unit of the data processor;

iv) decrementing the delay value using an arithmetic logic unit by a second predetermined value if the tested output signal is in a first state, the arithmetic logic unit being in the central processing unit of the data processor; and v) repeating steps iii) and iv) until the tested output is in a second state.

13. The method of claim 12 wherein the tested output signal is in the second state to indicate that the delay value is equal to the first predetermined value.

14. The method of claim 12 wherein the tested output signal is in the first state to indicate that the delay value is a value greater than the first predetermined value.

15. The method of claim 12 further comprising the step of:

storing a software program to be executed by the data processor in an internal memory, the delay instruction being an instruction included in the software program.

16. The method of claim 15 further comprising the steps of:

storing an address of an instruction currently being executed by the data processor in a program counter register in the central processing unit of the data processor, the address referring to a storage location in the internal memory; and incrementing the address stored in the program counter register when the tested output value is in the second state.

17. The method of claim 12 wherein the delay instruction has an opcode mnemonic of SLEEP.

18. The method of claim 12 wherein the delay instruction has a second portion, the second portion being an opcode and indicating that a delay operation is to be executed in the data processor.

19. The method of claim 12 further comprising the step of:

providing a decremented delay value to the register after decrementing the delay value by the predetermined value, the decremented delay value overwriting the delay value currently stored in the register.

20. The method of claim 12 wherein the first predetermined value is equal to zero.

21. The method of claim 12 wherein the second predetermined value is equal to one.

* * * * *